UNITED STATES PATENT OFFICE 2,524,801

HYDROXYBENZENESULFONAMIDO-OXADIAZOLES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,825

8 Claims. (Cl. 260—307)

This invention relates to new and useful sulfonamides and to methods of preparing the same.

It has been discovered that certain p-hydroxybenzenesulfonamido-oxadiazoles possess unexpected anti-viral activity, particularly in the neurotropic virus diseases and may, therefore, become important drugs in the treatment of these and related diseases. The new compounds of the present invention may be represented by the general formula:

in which R represents hydrogen or an aliphatic, aralkyl or heterocyclic radical, Z represents an oxadiazole radical attached to the amide nitrogen by a carbon in the heterocycle and R' represents hydrogen or an acyl group. The Z radical may bear one or more substituent radicals at the remaining positions such as alkyl, aryl, aralkyl, and the like, or it may form a part of a condensed heterocyclic system.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included with the scope of the present invention.

The new p-hydroxybenzenesulfonamido oxadiazoles may be prepared by several distinct methods, the more important of which will be described in the specific examples which follow. The preferred method is by the hydrolysis of a suitable ester of a p-hydroxybenzenesulfonamide under either acidic or alkaline conditions whereby the —OH group is formed in the reaction. These esters which have the general formula

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an amino oxadiazole in accordance with the following equation:

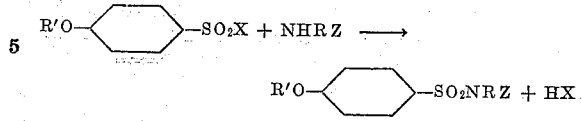

In the above R' is an acyl radical such as benzoyl, acetyl, furoyl, tosyl, carbethoxy or the like which may later be removed by hydrolysis. X is a halogen, preferable chlorine, but if desired fluorine or bromine.

Z is a radical such as mentioned above attached by a carbon atom of the oxadiazole ring.

To prepare intermediates in which R is an organic radical of the kind mentioned above, secondary amines such as 2-N-(beta-hydroxyethyl)-amino, 2-(N-methylamino) oxadiazole and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O— to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and in slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-amino-benzenesulfonamido oxadiazoles. This process involves diazotization of the p-amino-group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of a representative p-hydroxybenzenesulfonamido oxadiazole in the following example. All parts are by weight unless otherwise indicated.

*Example*

Fifty parts of $N^1$-(5-methyl-1,2,4-oxadiazol-3-yl) sulfanilamide (Anderson et al., J. A. C. S. 64, 2902, 1942, M. P. 211–213° d.) is dissolved in 1000 parts by volume of 3 N hydrochloric acid and the resulting solution is cooled externally to less than 10° C. while 1900 parts by volume of a N/10 solution of sodium nitrite is added slowly. While still cold, the clear, pale yellow solution thus obtained is added slowly to 2500 parts by volume of boiling N/1 sulfuric acid. The crude product which separates on cooling is filtered off, washed with water and dried. The yield is 26 parts of a fine, cream colored powder having a melting range of 215–218° C. with decomposition. Pure N-(5-methyl-1,2,4-oxadiazol-3-yl)-1-phenol-4-sulfonamide having a melting range of (225) 230–233 d. is obtained by recrystallizing the crude product from alcohol using decolorizing carbon. Analysis calculated for $C_9H_{10}N_4O_3S$: C, 42.3; N, 16.5; S, 12.5. Found: C, 42.4; N, 16.7; S, 12.2.

In accordance with the above disclosed method, the following additional p-hydroxybenzenesulfonamidooxadiazoles may be prepared:

N-(4-methyl-1,2,5-oxadiazol-3-yl)-1 phenol-4-sulfonamide

N-(5-methyl-1,3,4-oxadiazol-3-yl)-1 phenol-4-sulfonamide

N-(4-phenyl-1,2,5-oxadiazol-3-yl)-1 phenol-4-sulfonamide using as intermediates the appropriate sulfanilamido-oxadiazole.

Certain other p-hydroxysulfonamides and related compounds are set forth in applicants' copending application Serial Number 25,524, filed May 6, 1948.

The above compounds, and others may also be prepared by the method of condensing an aminooxadiazole with a p-acyloxybenzene-sulfonyl halide and converting the resultant product to a N-(oxadiazolyl)-1-phenol-4-sulfonamide by hydrolysis.

What we claim is:

1. Compounds of the general formula

where R' is chosen from the group consisting of hydrogen and acyl radicals and Z is an oxadiazolyl radical, and salts of said compounds.

2. Compounds of the general formula

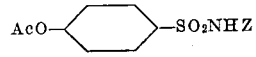

where Ac is an acyl radical and Z is an oxadiazolyl radical, and salts of said compounds.

3. Compounds of the general formula

where Z is an ozadiazolyl radical, and salts of said compounds.

4. N-(5-methyl-1,2,4 oxadiazol-3-yl)-1 phenol-4-sulfonamide.

5. N-(4-methyl-1,2,5-oxadiazol-3-yl)-1 phenol-4-sulfonamide.

6. N-(5-methyl-1,3,4-oxadiazol-3-yl)-1 phenol-4-sulfonamide.

7. The method of preparing compounds of the formula

where Z is an oxadiazolyl radical, which comprises the steps of diazotising compounds of the general formula

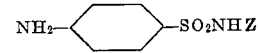

decomposing the resulting diazo group to a hydroxyl group in acid media at a temperature in the range of 0–150° C. and recovering the product.

8. The method of preparing N-(5 methyl-1,2,4 oxadiazol-3-yl)-1-phenol-4-sulfonamide, which comprises diazotizing $N^1$-(5-methyl-1,2,4 oxadiazol-3-yl) sulfanilamide, decomposing the diazo compound in acid media at a temperature in the range 0–150° C. and recovering and purifying said product.

MARTIN E. HULTQUIST.
ALOYSIUS J. BRYANT,
*Administrator of Estate of Yellapragada SubbaRow, Deceased.*

REFERENCES CITED

The following references are of record in the file of this patent:

Billon: Biologie Medicale, vol. 27, Supplement 1937, p. 84.

Kermack: J. Chem. Society (London), 1939, pp. 608–609.

Anderson et al.: J. Amer. Chem. Society, vol. 64, p. 2902 (1942).

Certificate of Correction

October 10, 1950

Patent No. 2,524,801

MARTIN E. HULTQUIST ET AL.

It is hereby certified that error appears in the printed specification of the above numbered patent requiring correction as follows:

Column 4, line 29, for "ozadiazolyl" read *oxadiazolyl*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*